US007596759B2

(12) United States Patent
Verna

(10) Patent No.: US 7,596,759 B2
(45) Date of Patent: Sep. 29, 2009

(54) INSTANT FOOTBALL WIDGET

(76) Inventor: Anthony F. Verna, 22152 Del Valle St., Woodland Hills, CA (US) 91364

( * ) Notice: Subject to any disclaimer, the term of this patent is extended or adjusted under 35 U.S.C. 154(b) by 242 days.

(21) Appl. No.: 11/799,874

(22) Filed: May 3, 2007

(65) Prior Publication Data

US 2007/0287431 A1 Dec. 13, 2007

Related U.S. Application Data

(60) Provisional application No. 60/802,714, filed on May 23, 2006.

(51) Int. Cl.
*G06F 3/00* (2006.01)
*G06F 3/048* (2006.01)
*G06F 3/14* (2006.01)
(52) U.S. Cl. .................. 715/772; 715/760; 715/764; 715/833; 715/864
(58) Field of Classification Search .............. 715/700, 715/760, 764, 772, 833, 864
See application file for complete search history.

(56) References Cited

U.S. PATENT DOCUMENTS

| | | | |
|---|---|---|---|
| 5,189,630 A | | 2/1993 | Barstow et al. |
| 5,526,479 A | | 6/1996 | Barstow et al. |
| 6,216,141 B1 | * | 4/2001 | Straub et al. ................. 715/234 |
| 7,490,295 B2 | * | 2/2009 | Chaudhri et al. ............. 715/764 |
| 2003/0008711 A1 | | 1/2003 | Corbo |
| 2007/0061724 A1 | * | 3/2007 | Slothouber et al. .......... 715/716 |
| 2007/0162850 A1 | * | 7/2007 | Adler et al. .................. 715/700 |

OTHER PUBLICATIONS

Meridix Broadcast Producer, Feb. 1, 2005, http://web.archive.org/web/20050204015856/www.meridix.com/golive/.*
Front Office Football 2004, Solecismic Software, Jan. 15, 2006, http://web.archive.org/web/20060105042536/www.solecismic.com/fof/index.php.*
Football Play by Play Tracker, Mar. 17, 2004, http://web.archive.org/web/20040401214528/wheelbarrowsoftware.com/fpbpt.htm.*
Ming Xu, Liam Lowey, James Orwell, Architecture and Algorithms for Tracking Football Players with Multiple Cameras, 2004 ,5 pages.*

* cited by examiner

*Primary Examiner*—Kieu Vu
*Assistant Examiner*—Yongjia Pan
(74) *Attorney, Agent, or Firm*—Lewis Brisbois Bisgaard & Smith LLP; Sanford Astor

(57) ABSTRACT

A widget adapted to constantly display on an electronic device having a screen, a grid having yard markers which represent the yard markers on a football field, a football which appears on the grid, means to move the football along the grid to represent the line of scrimmage of an actual football game after each play of the actual game.

18 Claims, 5 Drawing Sheets

INSTANT FOOTBALL WIDGET

FIELD OF THE INVENTION

The invention comprises a customized widget which appears on a computer monitor, a mobile phone or a wireless handheld device, showing the status of a particular live, ongoing football game.

BACKGROUND OF THE INVENTION

There are hundreds of football games played every week in the United States and some in other countries. There are high school games, college games, professional games, junior league games and other types of league games. Dozens of the games are televised, some nationally but most in a local geographical area, and there are many live games that are considered so insignificant that they are without recourse to having a live internet screen presence.

Some people watch games on television, or streamed live on their computers, and some listen on the radio, when a game is available over the air waves, but many people today, do not choose to spend their time watching or listening to a game and yet they are interested in how a particular game is progressing. It may be a game played by their alma mater, by a local team or one of many other reasons for their interest.

There is also a new group of usually young fans who will not sit for a couple of hours in front of a TV set. They have a shorter attention span and prefer to spend the time in front of their computer, surfing the Internet, e-mailing, IMing or Skyping.

There are many methods of getting other forms of up-to-date information on games as they are being played, but those methods are unsatisfactory because they may require clicking off what you are doing and going to a particular web page site and looking at a number of games and scores, which usually take up the entire computer screen. They also require going back to the screen periodically for further updates.

BRIEF DESCRIPTION OF THE INVENTION

Instant Footballer (I-F) is a cool, slim, live, updating device in the form of a widget, a template that lives on the desktop of a computer monitor and is able to automatically track the 'Game Ball' in a live football game and exhibit it as a rendering on the exact yard line where the ball is being spotted during a live game. The visualization of the ball's movement appears on a rectangular strip, or grid, at the bottom of a computer, cell phone or other electronic device screen, along with accompanying data. The visualization self-activates after each and every play, and eliminates the need to click off and visit a web site for an update.

Familiar widgets are clocks, weather monitoring, stock tickers, and other display information that appear on a computer, without the user activating them. I-F is designed specifically NOT to accompany live television or radio broadcast or Internet streaming or audio transmissions. I-F is a "stand alone" device delivering football game information, as a visual on-screen display in near to live time.

The purpose of I-F is to address the question: How do you get young fans to stay connected to a football game when they no longer will sit fixed for a couple of hours to a TV set, preferring to spend those hours surfing the Internet? I-F is a customized desktop/dashboard widget that has a persistent desktop presence, so as to deal with the next generation's short attention span or those persons who simply do not want to watch or listen to a game because it is not being broadcast in their area. I-F is a novel method to reach the younger computer audience who have the multi-dimensional ability to split their concentration, as well as others who prefer not to watch a game or cannot because it is not available on TV.

DETAILED DESCRIPTION OF THE INVENTION

Figure 1:
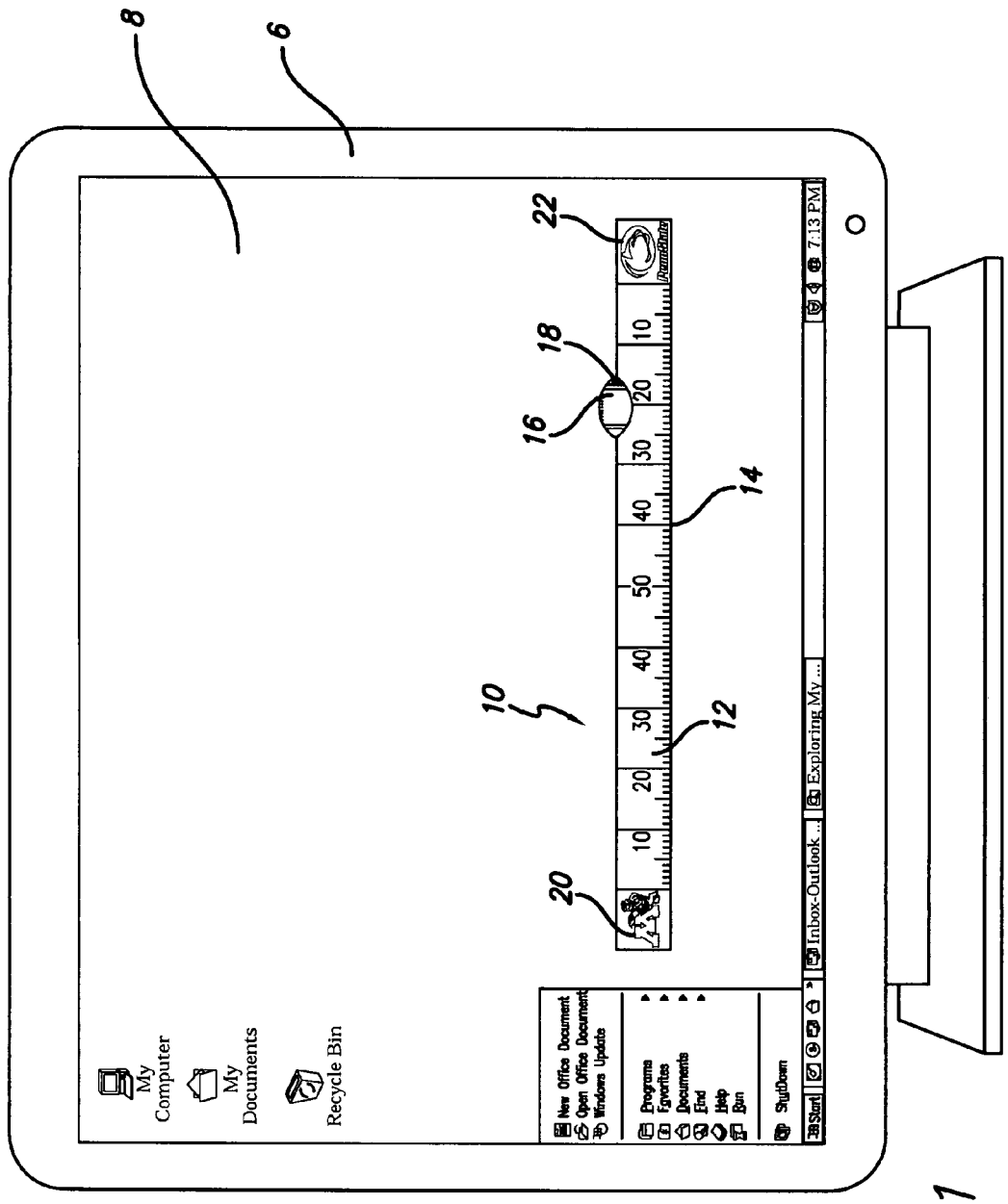
FIG. 1 is a depiction of a computer screen showing the invention.

The Instant Footballer (I-F) is for someone on the Internet who is neither watching nor listening to the live football game. The I-F stays on the screen, like radar, as you go about surfing, emailing, etc. The I-F event visualization occurs only within the end-user's (subscribers') desktop widget It's always there during the live game. It's always automatically updating itself. When you desire, you can just glance over to see what's happening in the game, right now!

If you take into consideration that the "Object of the Game" is to move that ball into the opponents' end zone, then "the movement of the football" is the meat of the game. Football is football! It's a game, not just for Live TV or Radio. It's not necessarily even for the people in the stands, considering that if a game were played without spectators, it would have no relevance on the movement of the football itself. With that in mind, I-F was designed specifically NOT to accompany a live, television or radio broadcast or Internet streaming of video or audio. I-F is a "stand alone" device. It is a live football game without the game and therefore, I-F does not include any audio or video of the live game being played, wherever it is being played.

I-F is for someone who wants to stay immersed in his computer and doesn't want to drag his attention away from e-mailing, surfing and IMing; someone who just needs a radar glance to see what's happening in a live game, who can't stay fixed on watching or listening. I-F lives on the user's desktop the entire time the user is on their computer. The user can hide the I-F with a push of one key, (e.g. F12), move it around at will, resize it and be able to view it in a collapsed or expanded state.

A football game has about 5 minutes of 'action' in a 60-minute game. That is where instant replay comes in and bails out football, making that game seem to have more "continuous" action than it really has. I-F distills those 5 minutes. The I-F method of live display and exporting to a computer desktop is a 'novel' process that provides a new or unexpected result (mainly, an Instant Scrimmage Report on a Live Game) that can be delivered automatically over the Internet in a new and novel manner.

After each play in the live game, the football display (left facing or right facing) automatically puts the football on the next scrimmage line. The football on the I-F is spotted on the exact yard line increment as the live game. The ball's direction is indicated by the intensification of color on its forward tip. The widget moves the football right in front of your nose on your computer or on your cell phone. I-F provides a form of information that fans can't get from other online sources.

The grid or template is designed to have the rectangular feel of a football field so that, as the ball moves after every play, the feeling takes on some aspect of the symbolic prowess of a gridiron. This live action-sequence of ball-movement is accompanied by down and distance, type of play, penalty, etc., as entered and refreshed in slotted spots on the screen. Additional (less pressing data), the quarter, the time and the game score become visible with one click of the mouse, that expands the template in an extend-down manner. Click again and the interface is sent back to its slim, collapsed-state.

Referring now to the drawings, there is shown a computer monitor 6 having a screen 8 on which is shown the widget 10 of this invention. The monitor has on the screen whatever the computer user normally may be doing, e-mail, writing letters, surfing the web, etc. Widget 10 comprises rectangular strip or grid 12 having line markers 14 depicting the yard markers of a football field. There is a marker for each yard of the field with the markers for each 10 yards being bigger and more prominent. A football 16 sits on the yard markers with the forward tip 18 of the football resting exactly on the line of scrimmage in the live game (as the ball is moving left to right). At the two ends of the strip, 20, 22 the logos of the teams playing can be shown, in this case, Minnesota and Penn State.

Figure 2:
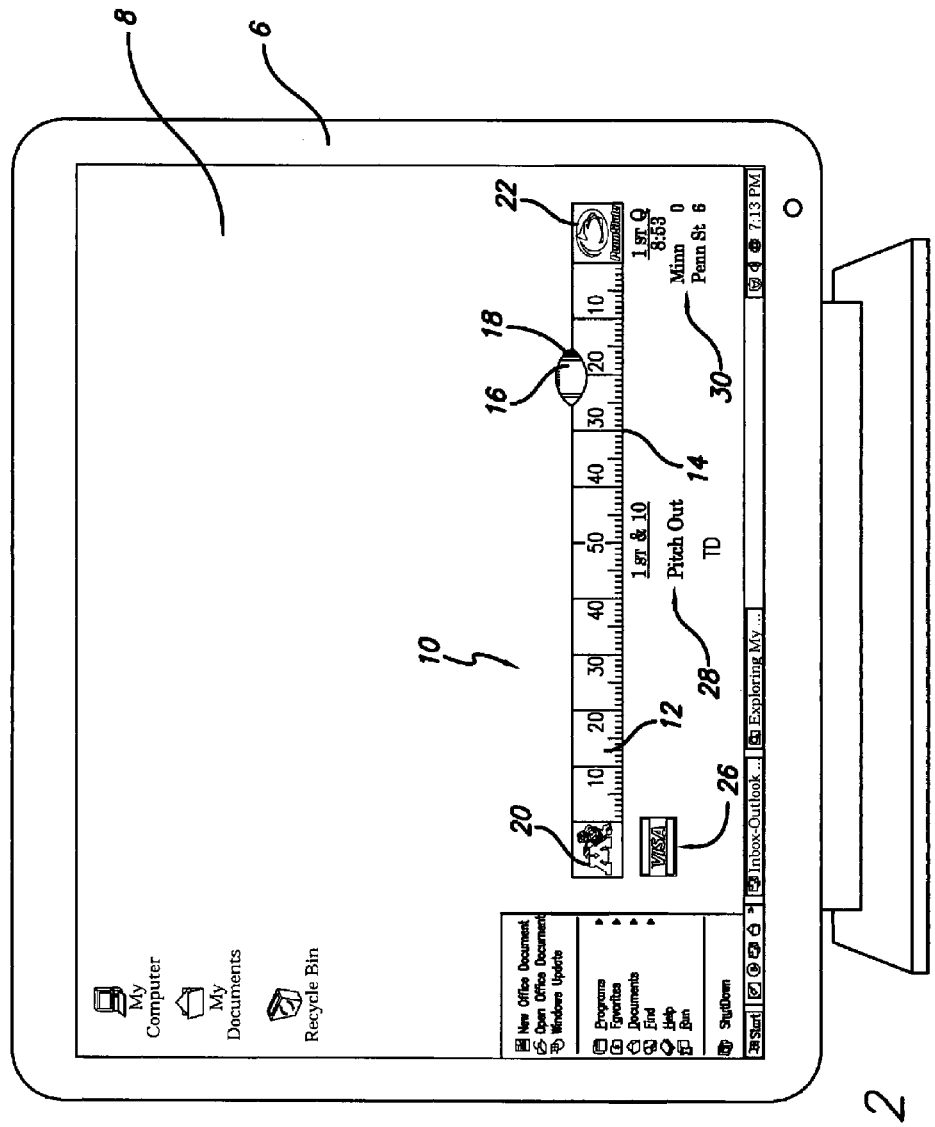
FIG. 2 is a depiction of an expanded version of the invention.

FIG. 2 depicts the same widget as shown in FIG. 1, but in addition, there is shown an extend down area below, grid 12 where additional information is shown, such as a sponsor logo 26, the down and yardage needed for a first down, the type of play and the result 28, the quarter, time and score, 30.

Figure 3:
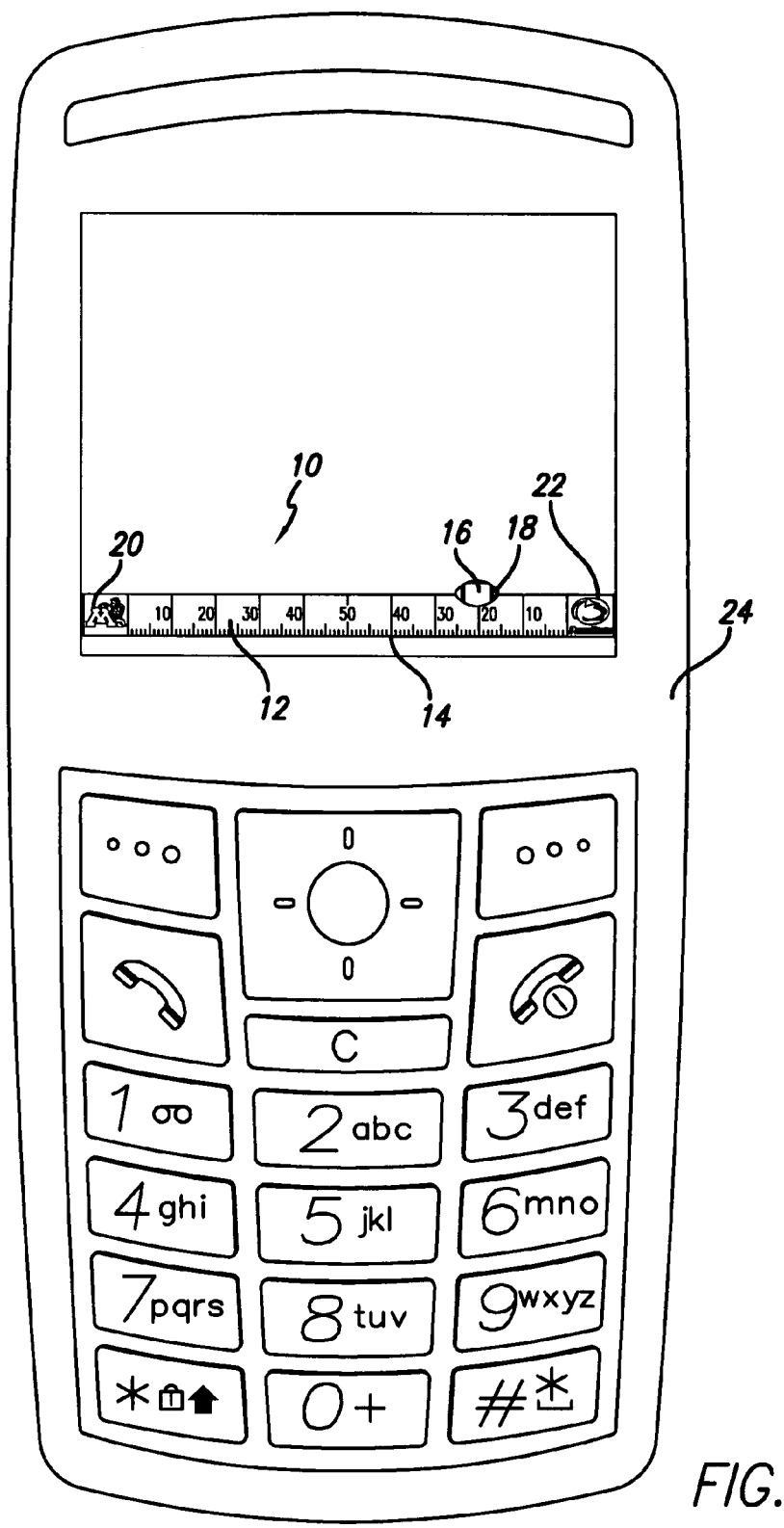
FIG. 3 is a depiction of the invention on a cellular phone.

FIG. 3 depicts the same widget 10 of FIG. 1, located on a cellular phone 24.

Figure 4:
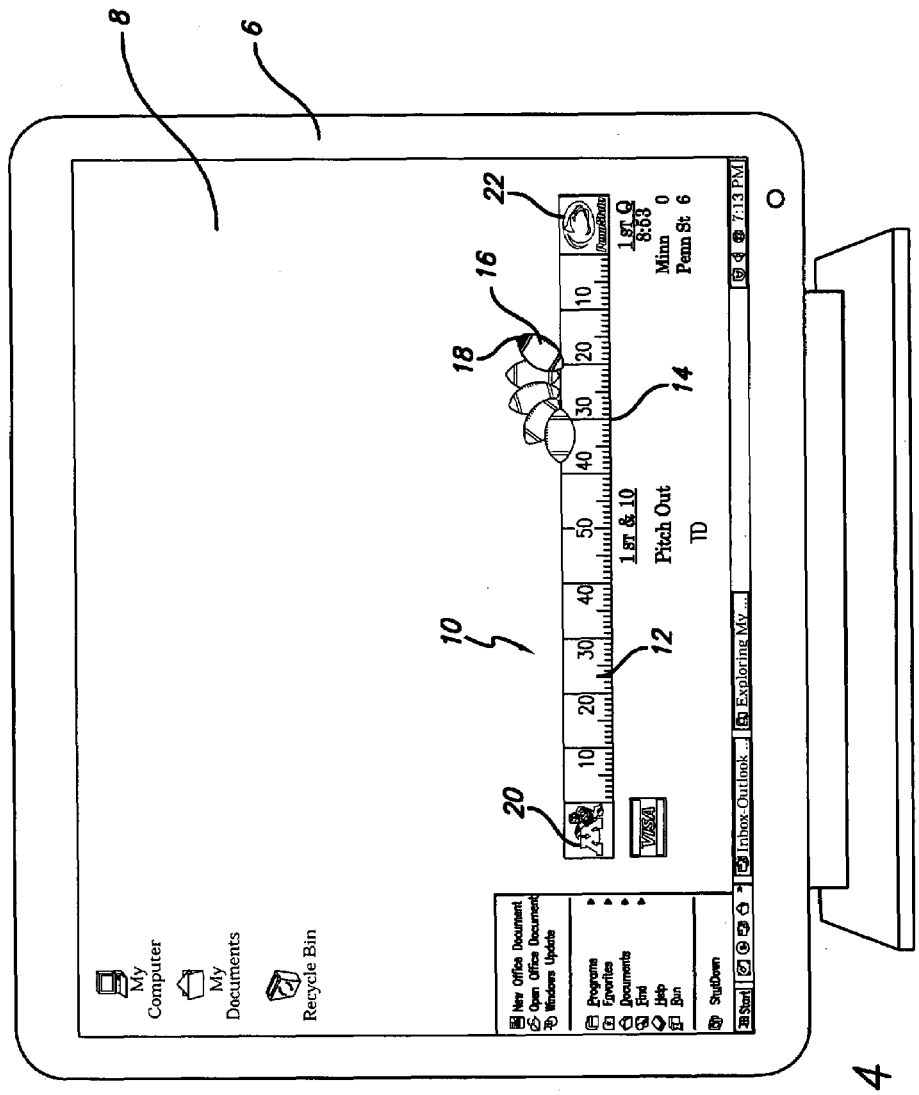
FIG. 4 is a depiction of a particular play in a football game.

FIG. 4 depicts a particular play, a fumble, in which the football 16 rotates, showing that the ball has been fumbled.

Current methods exist for providing ongoing football game information and scores. None of the current methods have any relevance to I-F and its method of visualizing the ball's movement, nor are any of the current methods capable of automatically delivering a "football rendering", spotted on the exact line of scrimmage, along with the needed accompanying information onto a computer screen, cell phone or any other web-enabled handheld device, during a live game, while the user has the computer screen available for other work. Examples of existing methods are;

The website "InstantSports" provides pitch-by-pitch baseball updates and a web scoreboard during a live baseball game in near real time, but the information is not supplied as a customized widget with the capabilities of the I-F. You must bring up the website to access the information.

"Instant Ballpark" provides live animated coverage and personalized replay of every pitch and every play of every Major League Baseball game. Animations show pitch, batter's swing, path of the ball, and defensive plays, as well as text description of the play. A VCR-like control panel allows the fan to move forward or backward in the game by pitch, play, or half inning, to replay any play of the game. Besides providing text-based baseball coverage, it also allows users with Java-enhanced Web browsers to watch any major league game—as it unfolds—on an animated field. Again, you must access the website to view the coverage.

U.S. Pat. No. 5,189,630, issued Feb. 23, 1993, claims, "A live event may be broadcast with a combination signal that includes a computer coded description of subevents that constitute the event and an audio or visual signal". The viewer's computer then provides an indication to the viewer of the occurrence of subevents of interest and allows the viewer of the event to search for such subevents in a recording of the event. This also uses computer simulation.

U.S. Pat. No. 5,526,479, issued Jun. 11, 1996, claims, "A live event may be broadcasted by producing a computer coded description of the sub-events that constitute the event".

The coded description is stored in a centralized computer database and the information thus stored is accessible to the viewer's computer. The viewer's computer then produces a computer simulation of the live event using the coded description.

Both of these patents, U.S. Pat. Nos. 5,189,630 and 5,526,479, involve broadcasting a live baseball game along with a computer code so that the viewer's computers can produce a simulation of the live baseball game on an animated field. I-F does not broadcast a live game for animation recreation. I-F is not animated. It is presented as a chosen photograph (on an RSS Feed) that is streamed with its accompanying text for insertion into the appropriate panes of the widget. U.S. Pat. Nos. 5,189,630 and 5,526,479 do not use a customized widget to do what I-F does, which is automatically delivering a "football rendering" accompanied with the needed information onto a registered subscriber's I-F Widget (computer screen, cell phone or any other web-enabled handheld device) during a live football game. It appears continuously on the user's screen, updating within itself, while the user can continue to work on other programs.

Motorola uses a beeper technology (not Internet) to provides baseball text information within 90 seconds of the actual occurrence. The beeper service doesn't provide the detail of InstantSports, but you always know the score and the inning situation (including animated little stick guys on the bases).

Streams of live coverage of certain football games are being transmitted across the Internet. For instance, you can go to AudioNetÂ® and listen to various live events, or subscribe to CSTV and watch a live stream camera coverage of a certain game.

"Sportvison" has a "$1^{st}$ and Ten" product that utilizes real-time rendering capability graphics to create the illusion that a yellow first-down line is painted on the field for televised games. They also invented a TV graphic on the necessary distance for a first down as play progresses, also to be used during a telecast.

"Enhanced TV" is data delivered via an Internet-connected computer and is controlled by the user while watching the show simultaneously on television and is relevant to sitting in front of a TV set.

Various providers, such as "AOL Alerts," send out live scores directly to cell phone screens or registered user's email inboxes. ESPN and other broadcasters, sports-lines, mobile services, and/or third party providers are delivering various text documents (a form similar to a news-alert service).

None of the sites are providing the simplified, succinct I-F application of the instant invention as a screen widget, which exists continuously on the viewer's screen, updating within itself, and not interfering with, whatever else the viewer is doing on the computer. Being a new and unique service, I-F makes it possible to cover minor football games such as: Hamilton Southeastern High playing at Lafayette Jefferson High School in Indiana. Or perhaps, supplying it to Marshall High to cover their football games in the LA area.

The main 2 things that set the Instant Footballer (I-F) apart from other 'game updating devices' are:

1) The I-F's novel ability to provide someone who is busy on his computer or cell phone with an image of a football being spotted on the exact yard line of a live game being played, without needing to do anything to activate or refresh it.
2) The I-F's unique capability in providing a visualization that lives within a rectangular strip on the computer or cell phone screen and automatically updates, so that end-user does not have to stop what he's doing and click off to a particular web page. None of the known methods provide I-F's live ongoing renderings of ball movement, as delivered to a subscriber's computer screen. None of the known providers are using a living widget replica (I-F) that can automatically move a football image right in front of your eyes while you are working away on your computer or talking on your cell phone.

It is also of interest to note, that none of the known methods described above have been able to stop the football viewers from disappearing. The Gen X and Gen Y fans have their in-between moments of interest, always moving on to something else. Browsing the Internet is what they do instead of watching TV.

I-F may utilize various methods to acquire the game information. The first method is tapping into existing formats currently being used by Game Tracker(s) as they transmit the live updates. Currently, all professional teams, most colleges and some high schools, have people already monitoring games to supply live, updated web pages showing Game Content.

The second method is by providing an I-F Tracker(s) at the live game site using I-F Software. This unique method allows a minor school to assign a student-tracker to cover their games and have a live web presence on the I-F widget.

The third method is using Trackers who are not physically present at the live event but are either watching the game on TV, streaming on the computer, listening to it on the radio, or having the updates phoned-in to the Tracker (this type of feed could serve live, minor events, such as less-publicized college football games or even high school games). A side benefit for such teams is that the use and presence of I-F would add relevance to their non-broadcast games.

I-F can capture the content of any football game and it can be provided on an event-by-event basis. First, the I-F tracker logs onto the "I-F Master Server" and selects the appropriate "Game ID". Then the I-F tracker inputs the live game data and transmits the "stream" to the "I-F Secondary Server", which receives and sorts the stream before immediately transmitting the stream to all I-F widgets of those subscribed to that game.

The subscriber accesses the customized I-F widget (skinned with the appropriate school colors) from the I-F Operating Software that resides on the I-F servers which store and manage the information, thus acting as the hub which connects and transmits the various, subscribed, live Game Content, to each and every I-F widget.

The transmission of this information is based on the use of a custom feed whereby subscribers online can download a compressed file, and have it automatically unzipped so as to be extracted onto the stand-alone widget that lives on their desktops, cell phones or web-enabled hand devices.

In addition to I-F's stand-alone capabilities, it may also function in conjunction with currently employed technologies. The I-F software could be adapted to comply with the current formats (RSS, XML) being used to collect live data as provided by such digital media companies as CSTV, iBN, iHigh and other such broadcasters.

The I-F content management system generates a feed by the use of a unique, aggregator-management-program that transmits the list-inputs as a module (in essence a stream) for feed-integration so that content can be imported into a single interface (the reader on the subscriber's desktop widget). The system uses RSS code or XML code, according to the software program being used by the 'Game Content Provider'. In addition to the common XML or RSS formats, designed for simple syndicating (distributing), the Instant Footballer could be configured to any other format that can read and parse data.

No matter what type of transmission is chosen, the Tracker has a software program whereby he can select from 200 grid-locations to spot the football. The ball and the grid are fixed images. This image is the 'line of scrimmage' (numeric 1 to 99 yards and goal line).

The 'football image' is not being moved along the widget by a cursor or any other type of programming. The system transmits a static image with the proper placement. The football placement on the grass strip grid is selected from a directory of 200 static renderings that display the ball on any given yard line increment. There are one hundred numeric values as the ball travels left to right, and another one hundred images when the ball moves right to left. The Tracker/Controller selects game content by checking-off from pull-down menus, column-formatted, employing pre-fixed-inputs, only. All selections are pre-built selections, as is the movement of the football itself. The Tracker's inputs are kept to a minimum, thus allowing for a quick selection from a multiple-choice menu. The Tracker points his mouse to choose from a preset menu of Yards and Down. (1 st and 10, 2nd and_yds, 3rd and_yds, 4th and_yds).

The ball movement, plus the other updates, are tagged with, for instance, XML identifiers, so that the software can determine where to display the Input Fields within the panes of the subscriber's widget bar. For example, there could be a minimum of 6 Inputs to be collected. This "one-load (stream) batch" would be exported to the Game Website, which is being served-up every time a live play is updated. To update the game content, the Tracker scrolls vertically through the type of play (Run, Pass) and the result (Fumble, Interception). As noted, nothing is typed in; all choices are displayed as lists in columns. These pre-set enumerator-variables allow the Tracker, a quick choice and it allows for the basis of the operating system devised for the I-F means of transmission.

The Tracker inputs the live data into a Secondary Server, wherein:
a) the nodes are the point at which the information is stored,
b) the nodes log into a Web GUI (graphical user interface) as a content management platform, so as to enter and update the Tracker's data.

The multiple pieces of Game Content are aggregated into a 'Single Point of Control' so as to transmit all the updated items in that one transmission stream. Each item in the batch is 'tagged' and is recognized as such, so that the output (stream) can be displayed on the specific panes of the subscriber's widget bar.

The template is designed to have the rectangular feel of a football field so that, as the ball moves after every play, the experience takes-on some aspect of the symbolic prowess of a gridiron, rather than being hidden away on a team's web page.

The live action-sequence of ball-movement is accompanied by down and distance, type of play, penalty, etc., as entered and refreshed in the slotted spots on the widget. Additional (less pressing data), the quarter, the time and the game score become visible with one click that expands the widget when needed.

Presently, there are no such Eye-Catchers of a live football game for those who are immersed in the Internet or on a cell phone. But the Instant Footballer can provide an early radar warning of an upcoming hazard, such as a 'fumble' by showing the ball-image tumbling on the screen widget. The ball turns into animation by using a standard GIF implementation. The ball appears to be moving because the split-second separations are fed back at a faster rate.

Other optional aspects that can be added include features such as allowing notification when a certain player, who was pre-selected, was involved in a play. A scoring play could come with a live shot, taken from a stadium webcam. Audio could be added. For instance, a student viewing a high school game could provide an audio stream to the I-F widget. With the aid of Java scripting, certain plays could come with an electronic sound bite or a sound bite in a player's voice. Other sounds could be fed to the widget. A shrill whistle could sound with a penalty notification, the six-note trumpet-charge played on a USC first down or the cavernous cheer of the cadet corps chanting, 'Go Army beat Navy.'

There could be a stimulus that will spur the youth on to skype, blog or text message about the game with someone else online . . . leading to a new form of media, a social networking that doesn't currently exist. In addition, the I-F allows a new form of communication for the students of a minor school, which could now have a live web presence.

The Instant Footballer business plan can range from the NFL to Major Conferences, Big Ten, and A-1 Division teams, plus the smaller conferences like Big Sky Conference and the Western Athletic Conference, that are now webcasting their live games for a subscription fee.

To subscribe to the Instant Footballer, all you have to do is to log on to a Football Team's Website. There you'll find the same information that feeds the widget. Once you've entered your ID information, just click-on to download the Widget Code software. A Widget Engine icon will appear that you can drag into your Applications Folder. In addition to subscription fees, the Instant Footballer could allow Clickable Banner Ads and/or Network Promos that would be linked to the marketers' web sites. The Wall Street Journal has noted that certain companies are developing customized widgets for their customers and they proclaim the inevitable 'widgetization of the Web'. That is why this invention comprises franchising the technology directly to the content owners (teams). The widget is skinnable and can be tailored to any team's colors and logos.

The Instant Footballer allows fans who are not watching the game, to be socially networked with one another—so as to provide a 'shared experience' by means of a 'media invention' that never existed before—one that would allow legions of fans to react and communicate with one another because of a live widget on their computer screen.

The Instant Footballer is not "programming," because programming is "hard" and HTML coding is "easy", for transmitting word formats with tags and bar graphs. A horizontal bar image using an HTML table is created. Each item in the batch is 'tagged' and is recognized as such for the output to be displayed on the subscriber's widget bar.

Content is selected by a Tracker (computer-person) who is viewing the game live or viewing (TV or Streaming) or listening (Radio or Internet) to the Live Football Game. The Tracker administers the event content by checking-off from pull-down MENUS, column-formatted, with pre-fixed inputs, only. Pre-built selections keep the Tracker's inputs to a minimum for a quick selection. The software is customized to feature multiple-choice selection. The Tracker selects a location on a grid to place the ball's image over the updated 'line of scrimmage' (numeric 1 to 99 yards and goal line) and then with a click, the ball and the grid both reappear with the ball at the new location.

The aggregated output of the "Action Widget" is then sent out to the subscriber base on the Internet with a click on the transmit button.

The inputs are a clickable table of contents on an easy to access menu aggregator, a program that manages the lists and presents them in a single interface. For example in the Oct. 1, 2005 Big Ten Game with Penn State scoring over Minnesota, the ball would have been on the 13-yard line. The Tracker would have updated the following: entries (a,b,c,d,e,f) selected and refreshed as follows:

| Ball on yd marker | (a) | Minnesota's 13 yard line. |
| Play Type | (b) | Pitch out |
| Down and Distance | (c) | TD (13 yd gain) |
| Game Time | (d) | 8:53 1st Q |
| Penalty/timeout | (e) | not applicable |
| Game Score | (f) | Minn: 0 Penn St: 6 |

The I-F content management system generates an RSS feed with an aggregator-management-program that exports the list-inputs as a module for feed-integration by importing it into a single interface (the display on the subscriber's desktop widget). RSS stands for Really Simple Syndication, which does uncomplicated things. It already exists and it's always been free for anybody to use. Nobody owns it, nobody controls it This invention is a custom I-F RSS Reader, whereby subscribers online can download the compressed file, and have it automatically unzipped to be extracted as a stand-alone widget that will live on their desktops.

While users are surfing, e-mailing and IMing or Skyping, they can turn I-F into a hot blogging topic as they text-message during the game they're not watching or being exported to their cell phone screens. A feature could be the live isolation and replication of a selected player's performance delivered to a user's desktop.

As mentioned, special effects can be added, such as electronic sound bites, custom alarms, active or passive, customized to suit the user's particular needs. Charge-trumpet on a first down, whistles blown, cheering fans, pounding of pads and helmets, all could be added. The football drum beating between plays getting louder as the play results, school cheers and songs could be added.

Other optional features could include pop-up notifications, spinning the football, etc. as an alert on a fumble, interception or a scoring play, fumbles (ball tumbling on the widget line) and with kicks and/or passes (ball arching above the bar line). Other features could include images (football, player images) turned animatic by using Animated GIFs implementation with split second separations.

Clickable banner ads and promos could appear, linked to marketers' Web sites, the ads can be bookmarked by viewers for future access so that I-F could be a real trend and an opportunity for content providers to deliver their message.

The Boola Boola factor is very high. College and High school usage could lead to an NFL deal, with franchising creating serious revenue potential.

Users would log on at the I-F Website in order to subscribe to the I-F Service.

a) The user would download the desktop/dashboard/gadget I-F Widget software, to be used as a reader (the user-interface on his computer screen) and/or; b) The user (subscriber) could also observe the same information via the I-F Website without having to install the I-F Widget Code to view the I.F. Service.

This invention uses RSS code, however there are other protocols for sharing and syndicating I-F content, since such data can be broken down into discrete items. E.G. Atom is being developed as a successor to and as an improvement over RSS. Like RSS, Atom is an XML-based specification, but more complex, so as to offer clients support for additional features, such as digital signatures and the like.

Basically, I-F updates in a common format, a lightweight HTML or XML format designed for syndicating (distributing) information and with other integrating Internet applications, protocols and formats, such as but not limited to, RSS, RSS2, XML, RPC, REST, SOAP, RDF, Atom, or any other programming language or run-time environment that can read and parse data in a manner suggested with the I-F System.

The I-F could also import and export OPML files, (Outline Processor Markup Language) to exchange subscription lists between programs that read the I-F RSS files on their Instant-Football widgets. This would be needed when adding input feeds, to be present on multiple computers on which Instant-Footballer is installed. The system can be operated by live inputting of data into an I-F secondary server:

a) wherein the nodes would be the point at which the information is stored. b) the nodes would log into a Web GUI (a content management platform) so as to enter and update the Tracker's data.

Figure 5:
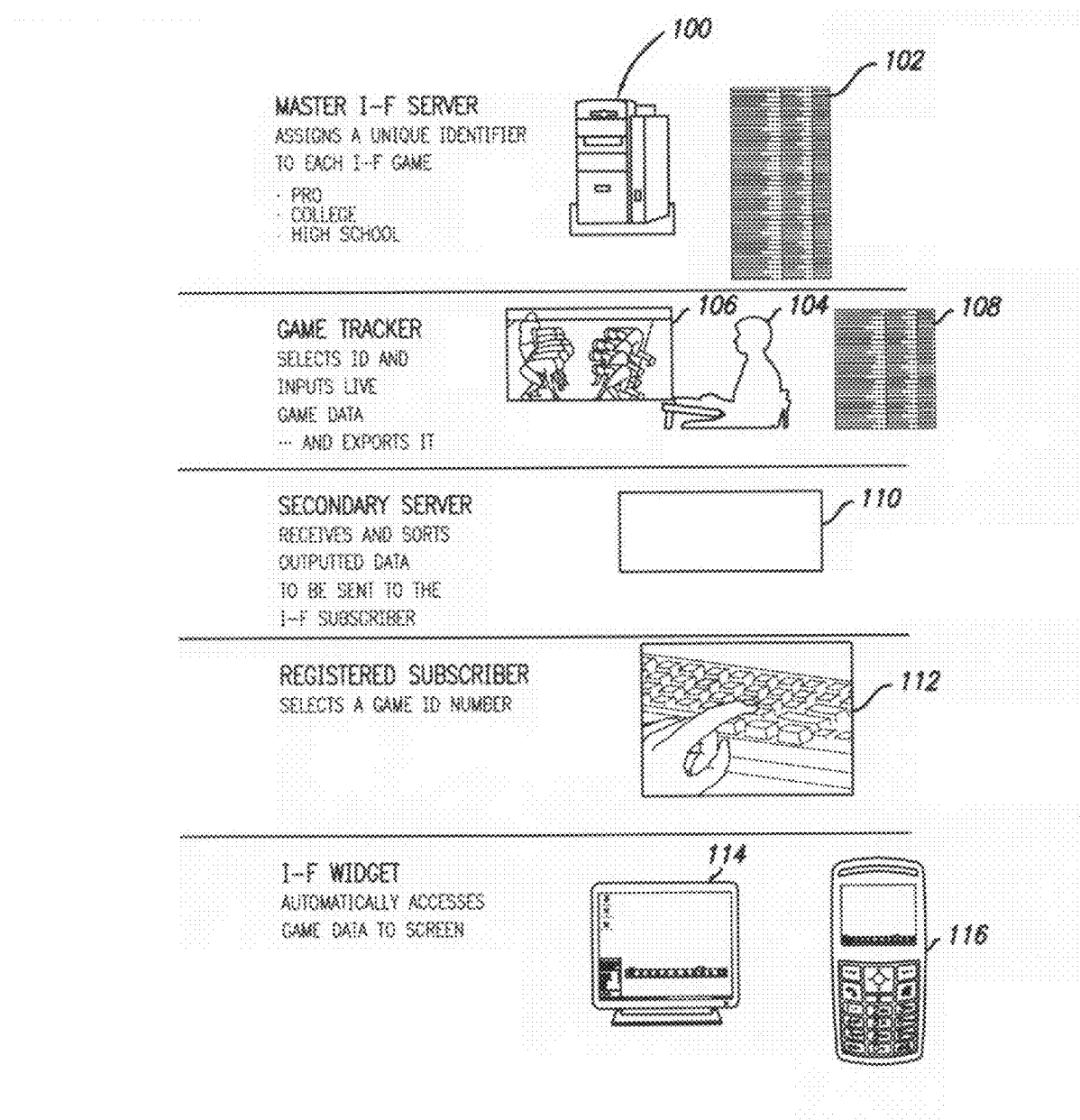
FIG. 5 is a flow chart of the I-F system.

Referring now to FIG. 5, there is shown a flow chart of the preferred embodiment of the I-F system. I-F operates through an I-F master server 100 that assigns a unique identifier (ID) for each I-F game available, as depicted by game list 102. The Game Tracker 104 who is watching the selected game on television 106, logs onto that game ID, to sort and select the output data, depicted as list 108. The output data 108 is sent to a secondary server 110 which receives and sorts the data to be sent to an I-F widget subscriber. The registered subscriber 112 selects a game ID number and the I-F widget on the subscriber's computer screen 114, or wireless phone screen 116, automatically and continuously, accesses the game data from secondary server 110 and converts it to the ball placement, and other information as described above, on the subscriber's computer screen 114, or alternatively, the subscriber's wireless phone screen 116.

If needed, the I-F design will interface with other application frameworks that are presently designed to handle content-management. The multiple pieces of content will aggregate into a single point of control so as to transmit all updated items in one transmission stream.

The server will update the feed when triggered by the Tracker's command. A second method may be employed whereby updates are sent on time-intervals. The update process would take place in a matter of seconds and the widget would update accordingly in a timely manner. Specifics of seconds and/or minutes remain dependent on the transmission method desirable by the client.

Under certain circumstances, to spread out subscriber-demand, the I-F Master Server, will feed the uploads to other servers in desirable time zones, so as to offset the server load. In any event, all servers would be updated by one Master Server.

While the invention has been described with reference to certain examples, the invention is not limited to the particular examples disclosed. Other variations may occur to those skilled in the art without departing from the scope of the invention.

I claim:

1. A method for continuously transmitting to a web-enabled electronic device having a screen and a user interface, data about the progress of a football game played on a football field having yard markers, said data comprising, the exact line of scrimmage for each play of the game, a game tracker who views the game, the game tracker inputting into a computer server the data about the game, including the line of scrimmage for each play of the game, the computer server converting the data about the game to the placement of a football icon on a grid comprising the yard markers of a football field, the computer server transmitting the converted game data to a self-activating widget on the electronic device screen which is continuously displayed on the screen, the widget comprising a grid having yard markers which represent the yard markers of a football field, a football icon which appears on the grid, on the exact line of scrimmage of the football game after each play of the game, the widget and the user interface both being active at the same time, the grid comprising 200 possible yard markers, 100 indicating the play going to the left and 100 indicating play going to the right, the direction of the play of the game, left or right, being indicated by intensification of the color of the football on its forward tip.

2. The method of claim 1 in which the game data further comprises one or more of the type of play, the down, the yards to go for a first down, the score, the game time, the quarter, and the result of the play.

3. The method of claim 1 in which the game tracker selects all game data from a pre-selected list of data present on the server.

4. The method of claim 1 in which the data is transmitted using a computer code selected from the group consisting of RSS, RSS2, XML, RPC, REST, SOAP RDF and ATOM.

5. The method of claim 1 in which the game tracker observes the game live, by television, streaming on a computer, listening on the radio, or having updates phoned in.

6. The method of claim 1 further comprising transmitting to the widget one or more features selected from the group consisting of electronic sound bites, custom alarms, whistles, crowd noise, game noise, band noise, school cheers and school songs.

7. The method of claim 1 in which the electronic device is a computer, a cellular phone or a personal digital assistant, having Internet access.

8. The method of claim 1 in which the game tracker, who is observing the football game, inputs the game data to a server, the data from the server is transmitted to a secondary server which converts the data and transmits the converted data to the widget appearing on the screen of the electronic device.

9. A method for continuously transmitting to a user's web-enabled electronic device having a screen and a user interface, data about one, of a plurality of football games, played by two opposing teams on a football field having yard markers, comprising a master computer server which assigns a unique identification number to each of the plurality of football games, said data comprising, the line of scrimmage for each play of the game, a game tracker, who is viewing a football game, logs onto the master computer server and selects the unique identification number of the football game being viewed by the game tracker, the game tracker inputting data about the football game into a secondary computer server which sorts the data about the game, including the line of scrimmage for each play of the game, the secondary computer server converting the data about the game to the placement of a football icon on a grid comprising the yard markers of a football field, the secondary computer server transmitting the converted game data to a self-activating widget on the user's electronic device screen which is continuously displayed on the screen and updated after each play, the widget comprising a grid having yard markers which represent the yard markers of a football field and a football icon which appears on the grid, on the exact line of scrimmage of each play of the football game, the widget and the user interface both being continuously active, the grid comprising 200 possible yard markers, 100 indicating the play going to the left and 100 indicating play going to the right, the direction of the play of the game, left or right, being indicated by intensification of the color of the football icon on its forward tip.

10. The method of claim 9 in which the user of the web-enabled electronic device selects a particular football game widget for his electronic device screen, by logging onto to the master server and entering the unique identification number for that particular game.

11. The method of claim 9 in which the game data_further comprises one or more of, the type of play, the down, the yards to go for a first down, the score, the game time, the quarter, and the result of the play.

12. The method of claim 9 in which the game tracker selects all game data to be transmitted from a pre-selected list of data present on the secondary server.

13. The method of claim 9 in which the data is transmitted using a computer code selected from the group consisting of RSS, RSS2, XML, RPC, REST, SOAP RDF and ATOM.

14. The method of claim 9 in which the game tracker observes the game by one of, live, by television, streaming on a computer, listening on the radio, or having updates phoned in.

15. The method of claim 9 further comprising transmitting to the widget one or more features selected from the group consisting of electronic sound bites, custom alarms, whistles, crowd noise, game noise, band noise, school cheers and school songs.

16. The method of claim 9 in which the electronic device is a computer, a cellular phone or a personal digital assistant, having Internet access.

17. The method of claim 9 in which the football icon spins as an alert on a fumble, interception or scoring play, tumbles when a fumble occurs and arches over the grid on a kick or passing play.

18. The method of claim 9 in which the logos of the teams playing the game are displayed on the widget, one at each end of the grid.

\* \* \* \* \*